United States Patent Office 3,606,469
Patented Sept. 20, 1971

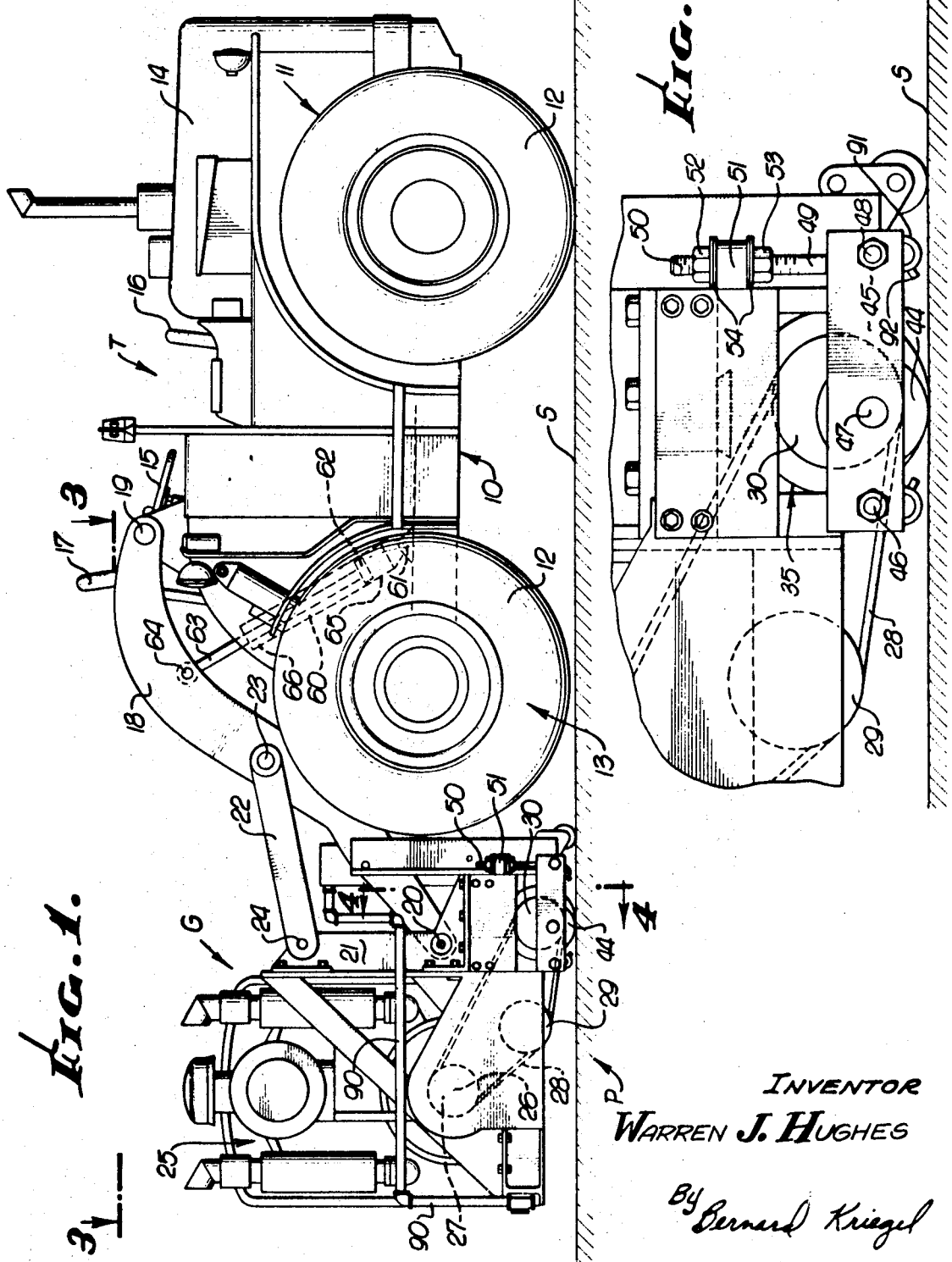

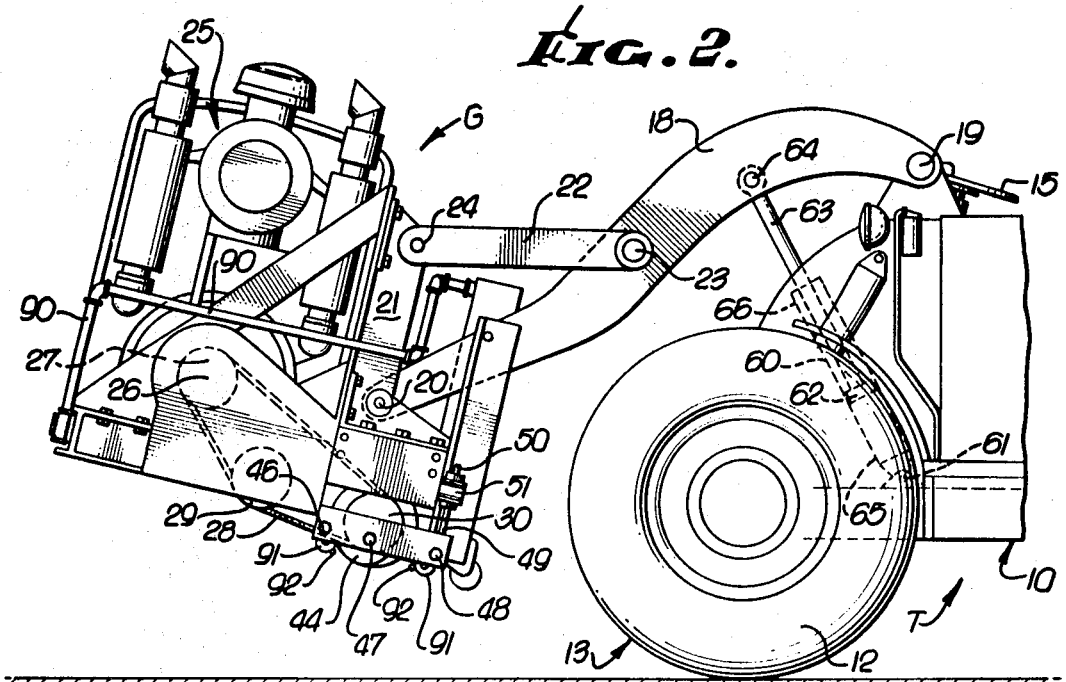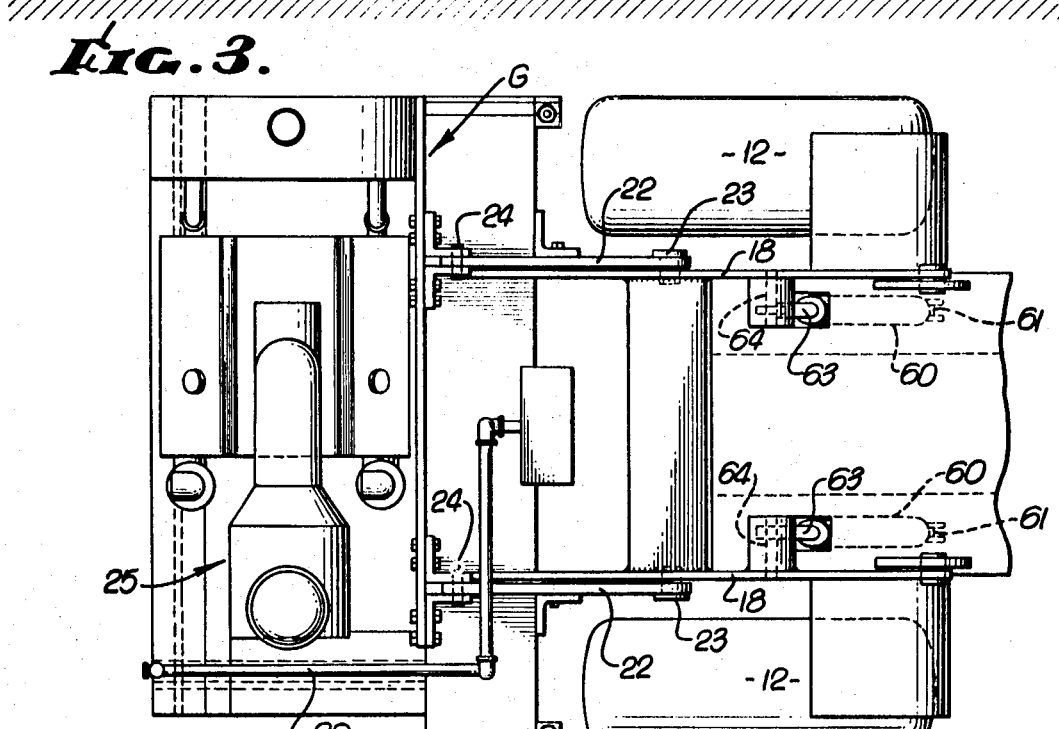

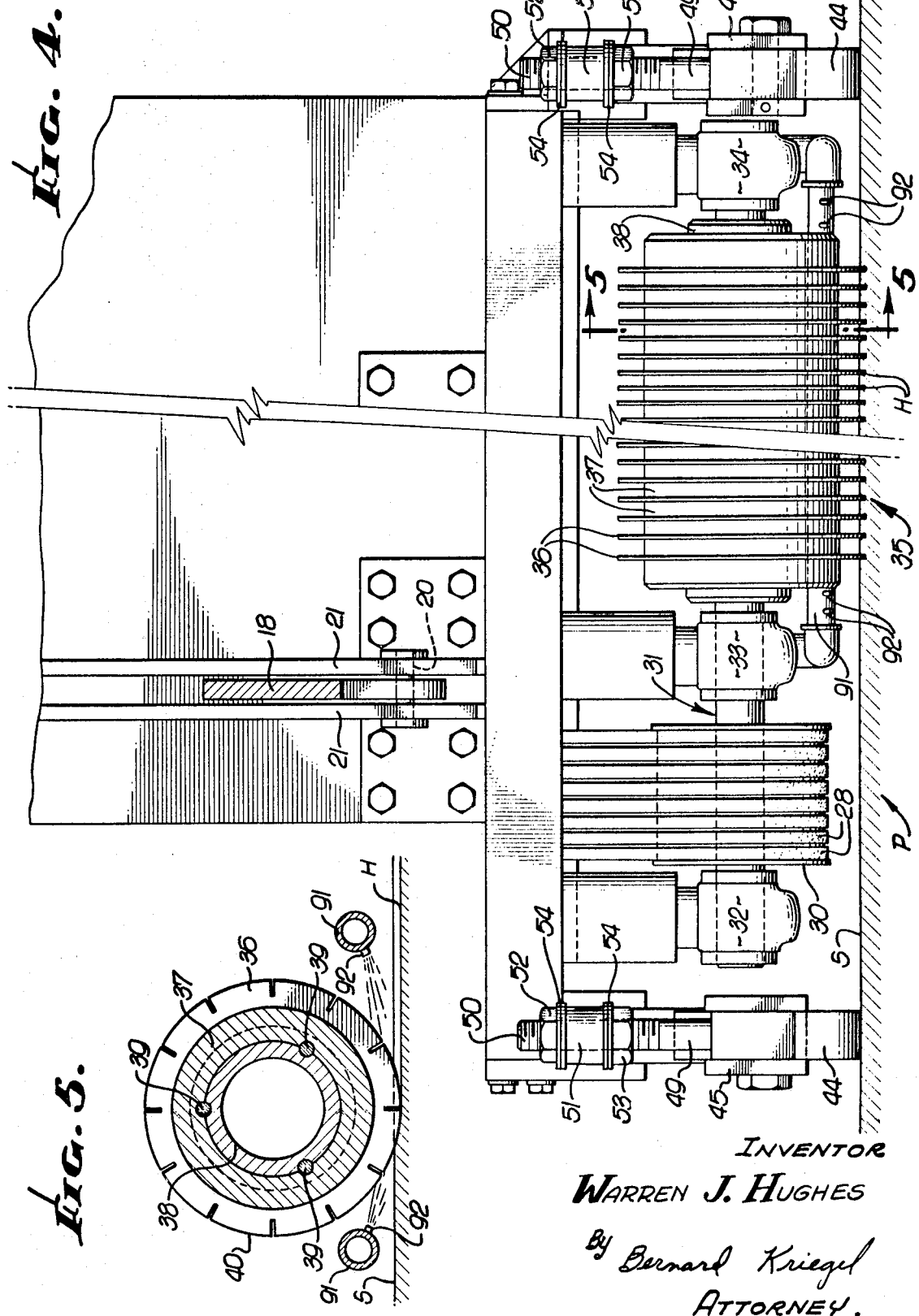

3,606,469
APPARATUS FOR CUTTING CONCRETE AND
SIMILAR ROADWAY SURFACES
Warren J. Hughes, Centerville, Utah, assignor to Christensen Diamond Products Company, Salt Lake City, Utah
Filed Sept. 5, 1969, Ser. No. 855,538
Int. Cl. E01c 23/09
U.S. Cl. 299—39
20 Claims

ABSTRACT OF THE DISCLOSURE

A four wheel vehicle carries a cutting unit that rotates a gang of saw discs or other cutters in contact with a concrete pavement to perform a cutting action thereon, such as to cut parallel grooves in the pavement to a desired depth. The cutting unit is disposed behind the vehicle rear wheels, with the cutters located between such wheels, a power source of the cutting unit rotating the cutters. The cutting unit can be raised from the pavement to permit all four wheels of the vehicle to engage the roadway for transporting the vehicle rapidly between locations. It can be lowered to contact its cutters with the pavement and elevate the vehicle rear wheels from the pavement so that the entire weight of the vehicle and cutting unit is supported by the pavement engaging portions of the cutting unit and the vehicle steerable front wheels, thereby insuring ample cutting weight and force of the cutters against the pavement while the entire combination is moved by the powered steerable wheels along the pavement.

---

The present invention relates to apparatus for cutting concrete roadway surfaces, such as highway and airport runway surfaces, and more particularly to apparatus capable of cutting parallel grooves in such surfaces to improve traction of vehicles and aircraft wheels thereover, especially during inclement weather.

Apparatus has been provided for cutting concrete roadway surfaces, such as cutting grooves therein, for the purpose of improving traction of vehicles moving thereover. As an example, a gang of closely spaced rotating saw blades having diamond matrix rim portions is brought to bear against the surface, while the saw blades are moved along the surface for the purpose of cutting parallel grooves therein to a desired depth, which, for example, may be about ⅛ inch. Difficulty with prior machines is their lack of sufficient weight to penetrate the saw blades into the roadway surface and to maintain the saw blades in the grooves, since they tended to elevate themselves with respect to the bottom of the grooves formed in the pavement. The securing of appropriate cutting weight resulted in the apparatus becoming extremely cumbersome and lacking in mobility, in addition to making it comparatively costly and, therefore, involving a great investment. Moreover, the prior apparatus possessed a comparatively poor weight distribution, had a relatively large overall length, its supporting framework was subjected to relatively high stresses, and assembly and disassembly of its cutters and related components were relatively difficult of accomplishment.

By virtue of the present invention, the aforenoted disadvantages of prior machines have been overcome. A machine is provided having sufficient weight to penetrate the cutters to the required depth in the pavement, the weight distribution between the cutters and the pavement engaging vehicle drive wheels approaching an ideal ratio, the location of the cutters on the cutting unit and with respect to the main portion of the vehicle being such as to maintain lower stresses in the framework supporting the cutting unit, and providing an overall shorter length assembly of vehicle and cutting unit carried thereby. In addition, the cutters and associated components of the cutting unit are readily accessible for facilitating their assembly and disassembly.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIG. 1 is a side elevational view of a machine embodying the invention, with one pair of its wheels elevated from a roadway surface, and with its cutter assembly in engagement therewith;

FIG. 2 is a side elevational view of the rear portion of the machine disclosed in FIG. 1, illustrating the grooving mechanism elevated from contact with the roadway surface and with the coaxial wheels adjacent thereto reengaged with the roadway surface;

FIG. 3 is a top plan view of a portion of the machine taken along the line 3—3 of FIG. 1;

FIG. 4 is an enlarged section taken along the line 4—4 on FIG. 1;

FIG. 5 is a cross-section taken along the line 5—5 on FIG. 4; and

FIG. 6 is an enlarged side elevational view of a portion of the grooving mechanism illustrated in FIG. 1.

The machine for grooving concrete and similar pavements P, illustrated in the drawings, includes a four-wheeled vehicle T, which may be of a conventional wheel loader type, manufactured by Caterpillar Tractor Co., and having a main frame or chassis 10 with one set or pair of steerable wheels 11 including pneumatic rubber tires 12, which, for convenience, may be referred to as steerable front wheels, and another set or pair of wheels 13 including rubber tires 12, which, for convenience, may be referred to as rear wheels. The unit has the usual internal combustion engine 14, such as a diesel engine, that drives through a torque converter or other infinitely variable ratio transmission (not shown) to both the front and rear wheels, to effect a four-wheel drive. The steerable wheels 11 are steered through a known mechanism by appropriate turning of a steering wheel 15, which may be manipulated by the driver sitting in the usual seat 16 when the vehicle is to be conveyed at a relatively rapid rate over the road between locations, or the steering wheel may be manipulated by the driver sitting in another seat 17 facing toward the steerable wheels 11, when the vehicle is to be used in the performance of a pavement grooving operation.

A pair of spaced swingable arms 18 are pivotally connected at their forward end portions to the upper part of the frame or chassis 10 by hinge pins 19, the rear lower ends of these arms being connected by pins 20 to the movable frame 21 of the grooving unit G of the machine. A pair of spaced apart upper arms 22 are also connected by forward connector pins 23 to the swing arms 18 and by rear connector pins 24 to the movable frame 21 of the highway grooving unit. Arms similar to the upper arms 22 and the lower portions of the swingable arms 18 had been connected to the bucket portion (not shown) of the wheel loader or tractor T, but such bucket portion has been removed and the movable frame 21 of the grooving unit G substituted in its place.

The movable frame 21, which is disposed behind the rear wheels 13 of the machine, carries an internal combustion engine 25, such as a diesel engine, the crankshaft 26 of which rotates a peripherally grooved drive pulley 27 through a releaseable clutch (not shown) and around which a plurality of V-belts 28 pass, such V-belts also passing over an idler peripherally grooved pulley 29 suitably rotatably mounted on the movable frame 21, and also over a peripherally grooved driven pulley 30 which is suitably fixed to a transverse drive shaft structure 31 (FIG. 4) supported by one side of the frame 21 by a pair of bearing supports 32, 33 suitably fixed to the frame, and also by a third bearing support 34 suitably secured to the frame at the opposite end portion of the drive shaft assembly 31. Between the second and third bearing supports 33, 34, the drive shaft assembly is suitably fixed to a saw blade assembly 35 comprising a plurality of saw discs or cutters 36 separated by spacers 37 and clamped to a mandrel 38 suitably attached to the drive shaft structure, the entire assembly being clamped together by a plurality of elongate key bolts 39 passing through the saw blade assembly (FIG. 5). The rim portion 40 of each saw blade comprises a matrix of diamonds and other materials for effectively cutting into the concrete roadway surface. The saw blade or cutter assembly 35 may assume any required form. One such assembly is illustrated and described in the patent application of Warren J. Hughes and Donald H. Mabey, Ser. No. 788,838, filed Jan. 3, 1969, for "Rotary Cutter Assembly."

The depth of penetration of the saw blades 36 into the roadway surface, that is to say, the depth of cut of the parallel saw blades in producing the grooves H in the roadway surface, is determined by a pair of depth-of-cut rollers 44 located at opposite sides of the movable frame 21. Thus, a support arm 45 is pivotally mounted on the frame 21 at each of its sides by a pivot pin 46, each arm having an axle 47 rotatably mounting a depth-of-cut roller 44 engageable with the roadway or airport runway surface S. The end of the support arm 45 opposite the pivot pin 46 is connected, by means of a pin 48, to a generally vertical adjustable rod or shaft 49 having an upper threaded portion 50 passing through a boss 51 fixed to the movable frame 21. Threadedly mounted on the threaded shaft portion 50 and above and below the boss 51 are nuts 52, 53 bearing against washers 54 engaging the upper and lower surfaces of the boss. Appropriate turning of the nuts 52, 53 at each side of the frame will effect vertical adjustment of the shafts 49 to move the forward ends of the support arms 45 up or down and shift the axes of the depth-of-cut rollers 44 with respect to the axis of the shaft 47. The rollers are located the desired distance above the lower peripheries of the saw blades 36, thereby determining the depth of penetration of the saw blades or cutters into the roadway surface S, which determines the depth of the grooves H cut into such surface. Following adjustment of the depth-of-cut rollers 44, the nuts 52, 53 are retightened against the washers 54 and the washers against the upper and lower sides of the bosses 51 to retain the depth-of-cut rollers in the position to which they have been adjusted.

The movable frame 21 and the saw blade assembly 35 and depth-of-cut rollers 44 carried thereby are shiftable as a unit in a vertical direction to bring the saw discs 36 and rollers 44 into and out of engagement with the pavement surface S. The shifting mechanism is similar to the one used for elevating the wheel loader bucket (not shown) when it was connected to the upper arms 22 and the lower ends of the swingable arms 18 of the mechanism. As illustrated, the actuating mechanism includes a pair of laterally spaced cylinders 60 having their lower ends connected by hinge pins 61 to the frame or chassis 10 of the wheel loader vehicle T. Each cylinder has a piston 62 slidable therein and secured to a piston rod 63 extending from the upper end of the cylinder and connected by a pin 64 to a swingable arm 18. The introduction of fluid under pressure into the head or lower ends 65 of the cylinders will shift the pistons 62 and piston rods 63 upwardly to swing the arms 18 and the entire movable frame 21 upwardly with respect to the roadway or pavement surface S. On the other hand, the bleeding of fluid under pressure from the head ends 65 of the cylinders and the introduction of such fluid under pressure into the upper or rod ends 66 of the cylinders will effect retraction of the piston rods 63 into the cylinders and downward movement of the swingable arms 18 and the movable frame 21 to bring the depth-of-cut rollers 44 and the saw blades 36 downwardly. Prior to lowering of the unit G, rotation of the saw blade assembly 35 by the internal combustion engine 25 of the movable frame 21 is initiated, operating through the pulley and belt drive mechanism 27–30. The continued application of fluid under pressure into the rod ends 66 of the cylinders 60, after the saw blades 36 have contacted the pavement surface S, will effect elevation of the rear of the frame or chassis 10 and the elevation of the rear wheels 13 from the pavement surface, as disclosed in FIG. 1. As a result, the weight of the entire machine is then being shared by the steerable wheels 11 and by the rotating saw blades 36 and depth-of-cut rollers 44, which are in contact with the pavement surface S.

The usual weight of the wheel loader type of mechanism T to which the movable frame 21, saw blade assembly 35, and depth-of-cut roller mechanism has been secured is quite large, and more than adequate for insuring penetration of the cutter 36 into the roadway surface S to the desired depth, with the depth-of-cut rollers 44 engaging the roadway surface to limit the extent of penetration of the saw blades into the pavement or concrete roadway P. The weight is more than ample for permitting relatively closely spaced saw blades 36 to be used, having an overall assembled width of five feet. For example, the blades 36 may be about twelve inches in diameter and have a center-to-center spacing from each other of about one inch. In other words, efficient penetration of the saw blades 36 into the pavement surface to the desired depth is effected when the assembly comprises about 60 blades rotating as a unit, the distance between the outermost blades being about five feet.

As stated above, the internal combustion engine 25 has been started and is rotating the saw blade assembly 35 prior to lowering of the latter into engagement with the roadway surface S by suitable introduction of hydraulic fluid into the rod ends 66 of the cylinders 60. The hydraulic fluid circuit is well known, being the same as that employed with a wheel loader bucket secured to the upper arms 22 and swingable arms 18 in place of the movable frame 21 illustrated in the drawings. Since the hydraulic system is known, it has not been illustrated in the drawings. With the rotating cutters 36 and depth-of-cut rollers 44 in contact with the pavement surface S, and with the rear wheels 13 elevated from contact therewith, the vehicle T is caused to move over the roadway surface in a forward direction, all four wheels 11, 13 being driven, the rear wheels 13 merely rotating freely, with the driving effort being transmitted through the front wheels 11 and their tires 12 to the pavement surface S, which exerts all of the drawbar pull necessary to traverse the vehicle T and the saw blades 36 along the roadway or pavement surface at the required speed. The operator sits in the grooving seat 17 and adjusts the over-the-pavement speed desired, manipulating the steering wheel 15 as required to maintain the entire machine and the saw discs 36 travelling in the desired direction.

At the end of a grooving cut, the operator need merely stop the vehicle and direct hydraulic fluid under pressure to the head ends 65 of the cylinders 60 to extend the piston rods 63 from their upper ends, thereby swinging the arms 18 upwardly to carry the entire movable frame mechanism 21 together with the saw blades 36 and the depth-of-cut rollers 44 substantially upwardly from the pavement surface S, as illustrated in FIG. 2, the rear wheels 13 recontacting the roadway or pavement surface. The vehicle can now be propelled at a relatively rapid rate to another location, which, for example, may be at the rate of about 15 to 25 miles per hour.

The wheel loader type of vehicle which the present invention utilizes in conjunction with the cutter assembly has great weight. Such weight is further increased by the very substantial weight of the movable frame 21, and the motive power device 25, transmission and cutter assembly mounted thereon. The entire machine, despite its great weight, does not exceed eight feet in width, enabling it to be moved over highways within existing governmental highway regulations. Its substantial weight enables a large multiplicity of saw blades or cutters to be used for taking an overall substantial cutting width, which, for example, may be five feet, with assurance that the cutters will not tend to climb out of the grooves H being cut, and thereby producing pavement grooves that have a uniform depth throughout their extent. The horsepower available in the internal combustion engine 25 for rotating the cutter assembly and the horsepower of the internal combustion engine 14 for propelling the vehicle over the roadway surface is more than adequate for the job to be performed. The infinitely variable ratio transmission (not shown), which forms a part of the wheel loader vehicle as purchased, permits the movement of the cutter assembly along the roadway surface in performing its grooving action at the appropriate linear highway speed for most effective cutter operation, which permits the cutters 36 to have a maximum life. During the cutting operation, the cuttings are flushed from the cutting region and the cutters are maintained in a clean and cool condition by flushing water, the supply of which is connected to suitable piping 90 mounted on the movable frame and which runs to a pair of headers 91 on opposite sides of the cutter assembly 35, discharging through a plurality of nozzles 92 onto the roadway surface S and the cutters themselves.

It is to be noted that the saw blade assembly 35, its drive shaft structure 31, and associated supporting mechanism are carried by the movable frame 21 at the forward portion of the latter at a position substantially in advance of the axis of the crankshaft 26 and to the rear of the rear wheels 13. The rotational axis of the driven pulley 30, drive shaft structure 31, and saw blade assembly 35 is below the axis of the crankshaft 26 and between the crankshaft 26 and the rear wheels 13. Thus, the internal combustion engine 25 and the transmission for transmitting the power from the engine crankshaft 26 to the saw blade assembly 35 are mounted on the movable frame 21 rearwardly of the saw blade assembly. With the arrangement disclosed and described, the overall length of the tractor T and the grooving unit G is held to a minimum, while the grooving unit G itself is maintained at a comparatively low height. Not only is the overall length of the entire machine relatively short, but the arrangement is such that the stress on the supporting framework, which includes the movable frame 21, the upper supporting arms 22 and the swingable arms 18, is held to a minimum because of the compact arrangement and relationship between the parts. The maintenance of lower stresses on the supporting framework becomes evident when compared with the location of the saw blade assembly 35, drive shaft structure 31 and related supporting bearings, and depth-of-cut roller to the rear of the crankshaft 26, and even directly under the center line of the crankshaft 26. With either of such arrangements, the bending moment on the supporting framework would be substantially increased, particularly since the overall length of such framework would be increased.

With the location of the rotational axis of the saw blade assembly 35, as illustrated in the drawings, between the rear wheels 13 and the crankshaft 26, the distribution of weight between the saw blades and depth-of-cut rollers 44, on the one hand, and the steerable front wheels 12, on the other hand, during the performance of a grooving action, approaches an ideal relationship, with assurance that more than ample weight is available for maintaining the saw blades or cutters at the desired penetration depth in the grooves, so as to cut grooves to such required depth as the vehicle moves over the pavement surface.

In addition to the foregoing advantages of the system illustrated, the placement of the saw blade assembly 35, its drive shaft structure 31, and associated transmission mechanism and bearing supports, greatly facilitates assembly and disassembly of the components of the saw blade assembly, the bearings carrying the drive shaft structure, pulley mechanism, depth-of-cut roller supporting mechanism, and the like, in view of their ready accessibility on the movable frame 21. As disclosed in FIG. 2, the elevation of the grooving unit G renders the various parts comparatively easy to reach, enabling assembly, as well as disassembly, to take place in a comparatively short period. Such assembly and disassembly may occur at the job site because of the necessity for replacing saw discs or cutters 36 that may become worn, or otherwise damaged.

It is thus apparent that a combination has been provided that permits the securing of an ideal distribution of weight between the saw blade assembly 35 and the depth-of-cut rollers 44 and the powered wheels 12, results in a shorter overall length of the entire vehicle and grooving unit structure, results in lower stresses being imposed on the supporting framework, and facilitates assembly and disassembly of the cutter and related components, such as bearings, cutter blades, spacers, shaft elements, and the like.

I claim:

1. In a machine for cutting a roadway surface traversed by vehicles: a vehicle having roadway engaging wheels and including drive means for one or more of said wheels; cutter means carried by said vehicle for cutting the roadway surface; and means for rotating said cutter means to cut the roadway surface; and means for moving said cutter mean selectively into and from load supporting engagement with engagement with the roadway surface, said moving means being operable to lift a portion of said vehicle to raise at least one of its wheels from the roadway surface and thereby apply part of the weight of the vehicle to said cutter means when said cutter means is engaged with the roadway surface, said moving means effecting reengagement of said one wheel with the roadway surface upon elevation of said cutter means from the roadway surface; said rotating means being located longitudinally beyond said vehicle and said raised wheel, said cutter means being disposed between said rotating means and said raised wheel.

2. In a machine as defined in claim 1; said cutter means comprising a plurality of rotatable adjacent saw discs for cutting parallel grooves in the roadway surface.

3. In a machine as defined in claim 1; said cutter means comprising a plurality of rotatable adjacent saw discs for cutting parallel grooves in the roadway surface; and means engageable with the roadway surface for limiting the depth of penetration of said saw discs thereinto.

4. In a machine for cutting a roadway surface traversed by vehicles: a vehicle having a roadway engaging set of forward wheels and a roadway engaging set of rear wheels and including drive means for at least one of said sets of wheels; a frame connected to said vehicle and movable vertically with respect thereto; cutter means rotatably mounted on said frame; means for rotating said cutter means to cut the roadway surface comprising a prime mover carried by said frame and transmission means between said prime mover and cutter means; means operatively connected between said vehicle and frame for moving said frame vertically to selectively elevate said cutter means from the roadway surface or to shift said cutter means into engagement with the roadway surface and elevate a set of wheels from load supporting engagement with the roadway surface, whereby the weight of the frame and a portion of the weight of the vehicle are applied to said cutter means; said vehicle, frame and cutter means being moved along the roadway surface by said drive means rotating the set of wheels remaining in engagement with the roadway surface; said frame, cutter means, prime mover and transmission means being located longitudinally outwardly of said elevated set of wheels, said cutter means being located between said prime mover and said elevated set of wheels.

5. In a machine as defined in claim 4; means for steering said set of wheels remaining in engagement with the roadway surface.

6. In a machine as defined in claim 4; said prime mover having a drive shaft extending crosswise of said frame, said cutter means extending crosswise of said frame.

7. In a machine as defined in claim 4; said prime mover having a drive shaft extending crosswise of said frame, said cutter means extending crosswise of said frame, the axes of said drive shaft and cutter means being substantially parallel to each other.

8. In a machine as defined in claim 4; said prime mover having a drive shaft extending crosswise of said frame, the axes of said drive shaft and cutter means being substantially parallel to each other, said transmission means comprising a drive pulley fixed to said drive shaft, a driven pulley fixed to said cutter means, and a belt in drivable engagement with said drive and driven pulleys.

9. In a machine as defined in claim 4; said prime mover being disposed crosswise on said frame and located on the rear portion thereof, said prime mover including a drive shaft extending crosswise of said frame, said cutter means extending crosswise of said frame and at a substantially lower elevation than said drive shaft.

10. In a machine as defined in claim 4; said prime mover being disposed crosswise on said frame and located on the rear portion thereof, said prime mover including a drive shaft extending crosswise of said frame, said cutter means extending crosswise of said frame and at a substantially lower elevation than said drive shaft, said transmission means comprising a drive pulley fixed to said drive shaft, a driven pulley fixed to said cutter means, and a belt in drivable engagement with said drive and driven pulleys.

11. In a machine as defined in claim 4; said cutter means comprising a plurality of rotatable adjacent saw discs for cutting parallel grooves in the roadway surface.

12. In a machine as defined in claim 4; said cutter means comprising a plurality of rotatable adjacent saw discs for cutting parallel grooves in the roadway surface; and means carried by said frame and engageable with the roadway surface for limiting the depth of penetration of said saw discs thereinto.

13. In a machine for cutting a roadway surface traversed by vehicles: a vehicle having a roadway engaging set of steerable forward wheels and a roadway engaging set of rear wheels, said vehicle including drive means for rotating at least said steerable forward wheels; a frame connected to said vehicle and extending rearwardly of said rear wheels and being movable vertically with respect to said vehicle; cutter means rotatably carried by said frame; means for rotating said cutter means to cut the roadway surface comprising a prime mover carried by said frame and transmission means between said prime mover and cutter means; means operatively connected between said vehicle and frame for moving said frame vertically to selectively elevate said cutter means from the roadway surface or to shift said cutter means into engagement with the roadway surface and elevate said rear wheels from load supporting engagement with the roadway surface, whereby a portion of the weight of the frame and the weight of the rear portion of the vehicle are applied to said cutter means; said vehicle, frame and cutter means being adapted to be moved along the roadway surface by the drive means rotating said forward wheels and with said cutter means engaged with the roadway surface and said rear wheels elevated therefrom; said frame, cutter means, prime mover and transmission means being located longitudinally behind said set of rear wheels, said cutter means being located between said prime mover and said set of rear wheels.

14. In a machine as defined in claim 13; said prime mover having a drive shaft extending crosswise of said frame, said cutter means extending crosswise of said frame.

15. In a machine as defined in claim 9; said prime mover having a drive shaft extending crosswise of said frame, said cutter means extending crosswise of said frame, the axes of said drive shaft and cutter means being substantially parallel to each other.

16. In a machine as defined in claim 13; said prime mover having a drive shaft extending crosswise of said frame, said cutter means extending crosswise of said frame, the axes of said drive shaft and cutter means being substantially parallel to each other, said transmission means comprising a drive pulley fixed to said drive shaft, a driven pulley fixed to said cutter means, and a belt in drivable engagement with said drive and driven pulleys.

17. In a machine as defined in claim 13; said prime mover being disposed crosswise on said frame and located on the rear portion thereof, said prime mover including a drive shaft extending crosswise of said frame, said cutter means extending crosswise of said frame and at a substantially lower elevation than said drive shaft.

18. In a machine as defined in claim 13; said prime mover being disposed crosswise on said frame and located on the rear portion thereof, said prime mover including a drive shaft extending crosswise of said frame, said cutter means extending crosswise of said frame and at a substantially lower elevation than said drive shaft, said transmission means comprising a drive pulley fixed to said drive shaft, a driven pulley fixed to said cutter means, and a belt in drivable engagement with said drive and driven pulleys.

19. In a machine as defined in claim 13; said cutter means comprising a plurality of rotatable adjacent saw discs for cutting parallel grooves in the roadway surface.

20. In a machine as defined in claim 13; said cutter means comprising a plurality of rotatable adjacent saw discs for cutting parallel grooves in the roadway surface; and means carried by said frame and engageable with the roadway surface for limiting the depth of penetration of said saw discs thereinto.

References Cited

UNITED STATES PATENTS

| 2,874,948 | 2/1959 | Bjorkman et al. | 299—39X |
| 3,156,231 | 11/1964 | Harding | 173—24X |
| 3,357,745 | 12/1967 | Cooper | 299—39 |
| 3,464,737 | 9/1969 | Haase et al. | 299—39 |

ERNEST R. PURSER, Primary Examiner

PO-1050
(5/69)

UNITED STATES PATENT OFFICE
CERTIFICATE OF CORRECTION

Patent No. 3,606,469   Dated September 20, 1971

Inventor(s) WARREN J. HUGHES

It is certified that error appears in the above-identified patent and that said Letters Patent are hereby corrected as shown below:

Column 6, line 34, cancel "and"; lines 36 and 37, cancel "load supporting engagement with"; line 39, after "from" insert --load supporting engagement with--.

Column 7, line 20, before "the" insert --said cutter means extending crosswise of said frame,--.

Signed and sealed this 21st day of March 1972.

(SEAL)
Attest:

EDWARD M. FLETCHER, JR.
Attesting Officer

ROBERT GOTTSCHALK
Commissioner of Patents